United States Patent
Lisewski et al.

(10) Patent No.: US 10,951,694 B2
(45) Date of Patent: Mar. 16, 2021

(54) PEER TO PEER COMMUNICATIONS FOR REPAIRING WIRELESS MULTICAST/BROADCAST DELIVERED CONTENT

(71) Applicant: Verizon Patent and Licensing Inc., Arlington, VA (US)

(72) Inventors: Kevin Lisewski, Ramsey, NJ (US); Mansoor Ali Shah Mohammed, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 50 days.

(21) Appl. No.: 16/283,024

(22) Filed: Feb. 22, 2019

(65) Prior Publication Data

US 2020/0274922 A1 Aug. 27, 2020

(51) Int. Cl.
*H04L 29/08* (2006.01)
*H04W 76/15* (2018.01)

(52) U.S. Cl.
CPC ............ *H04L 67/104* (2013.01); *H04L 67/06* (2013.01); *H04W 76/15* (2018.02)

(58) Field of Classification Search
CPC ..... H04L 67/06; H04L 67/104; H04L 67/108; H04L 67/10; H04L 51/18
See application file for complete search history.

(56) References Cited

U.S. PATENT DOCUMENTS

| | | | | |
|---|---|---|---|---|
| 2003/0204602 | A1* | 10/2003 | Hudson | H04L 67/06 709/228 |
| 2010/0169277 | A1* | 7/2010 | Shyu | H04L 67/104 707/622 |

* cited by examiner

*Primary Examiner* — Barbara B Anyan

(57) ABSTRACT

A method for repairing multicast/broadcast content via peer to peer communications, which includes receiving at least a part of a file transmitted by a wireless multicast/broadcast service (WMBS) session via an access network; exchanging, via a peer to peer network, completion messages between the UE device and peer UE devices upon completion of the WMBS session; identifying an amount of the file received at the UE device, and amounts of the file received at each of peer UE devices based on the exchanged completion messages; sending repair data to repair the file on each peer UE devices in response to identifying that the UE device received the entire file; and sending repair data via the peer to peer network, obtained from the access network, in response to identifying that the UE device received less than the entire file and more of the file than each of the group of peer UE devices.

20 Claims, 9 Drawing Sheets

PEER TO PEER COMMUNICATIONS FOR REPAIRING WIRELESS MULTICAST/BROADCAST DELIVERED CONTENT

BACKGROUND

A wireless multicast/broadcast service (WMBS) is a point-to-multipoint service in which data is wirelessly transmitted from a source to multiple destinations. For example, in a long term evolution (LTE) system, one WMBS based on 3GPP is the enhanced multimedia broadcast multicast services (eMBMS). The WMBS is designed to provide various types of content to end devices using broadcast and multicast delivery methods. In some instances, end devices may not receive complete data sets over a WMBS which may result in incomplete files. Conventional techniques to repair incomplete files should occur within a limited time window, and may result in excess bandwidth consumption, increased costs, and/or excess loads on network components.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Embodiments described herein are directed to peer to peer mechanisms for repairing content delivered over wireless multicast/broadcast service (WMBS). As used herein, the term WMBS is broadly defined as a communication service that may transmit in a multicast mode (one to multiple end devices in a service area) and/or a broadcast mode (one to all end devices in a service area) via a wireless network. WMBS provides an efficient mechanism to deliver common content over the wireless network which may be directed to targeted areas which are referred to herein as WMBS service areas.

At the conclusion of a WMBS session, end devices may not receive the entire file as intended. Situational and/or environmental conditions may prevent end devices from receiving the entire (100%) of the file. For example, end devices being located in buildings or structures which attenuate radio frequency (RF) signals may result in only partial files being received. Other obstructions based on topology and/or occluding objects can also impede reception. In other situations, problems with the end device may prevent full reception. Existing standards (e.g., 3GPP TS 26.346) provide conventional mechanisms to enable the repair of an incomplete file received over a WMBS session on an end device. The conventional mechanisms are based on unicast transmission from the network to retrieve the data required to complete the missing files on the end devices. The conventional file repair mechanisms are time sensitive, thus end devices must tune in precisely within a very short time window at the end of a WMBS session to download symbols before data representing the file is purged from the WMBS platform facilitating the session. Moreover, conventional file repair systems may not limit the number of end devices which may simultaneously attempt to contact the WMBS platform. Two of the conventional file repair mechanisms are described below in more detail.

A first conventional mechanism is known as "byte range file repair," where end devices may download missing symbols representing the data file directly from a content distribution network (CDN) over a unicast session. With byte range file repair, a unicast session may be established between the end device and the CDN based on metadata in the associative data function (APD) fragment. Disadvantages to byte range file repair may include: 1) increased costs, as calls to the CDN incur charges; 2) excess bandwidth consumption as end devices compete to perform unicast file repair; 3) time constraints for obtaining missing symbols due to the CDN only storing the file for a limited time, and the standard only allowing unicast connections for repair a short time after the WMBS session has ended; and 4) performance and/or availability for repair may be contingent on CN load balancing performance.

A second conventional mechanism is known as "conventional file repair," where end devices may download missing symbols representing the data file from the WMBS platform over a unicast session via a network. In an embodiment, an end device may establish a unicast connection with an associative data function (ADF) within a broadcast multicast service center (BMSC)). Disadvantages to conventional file repair may include: 1) excess bandwidth consumption as end devices compete to perform unicast file repair; 2) time constraints for obtaining missing symbols due to the standard only allowing unicast connections for repair a short time after the WMBS session has ended; and 3) request from a large number of end devices may overload the BMSC.

Despite the provisions provided by the conventional file repair mechanisms, some end devices may be unable to complete the file download. Accordingly, embodiments herein provide approaches to circumvent each end point device having to repair files over a unicast connection with the network. Instead, end point devices may form a peer to peer network and exchange symbols with proximate end devices to obtain missing symbols for incomplete file downloads. Using peer to peer communications to facilitate file repair may reduce the amount of network bandwidth consumption for the file repair, alleviate the time constraints of conventional methods, avoid overloading network components such as the BMSC, and improving the reliability of the file repair to each end device.

Figure 1A:
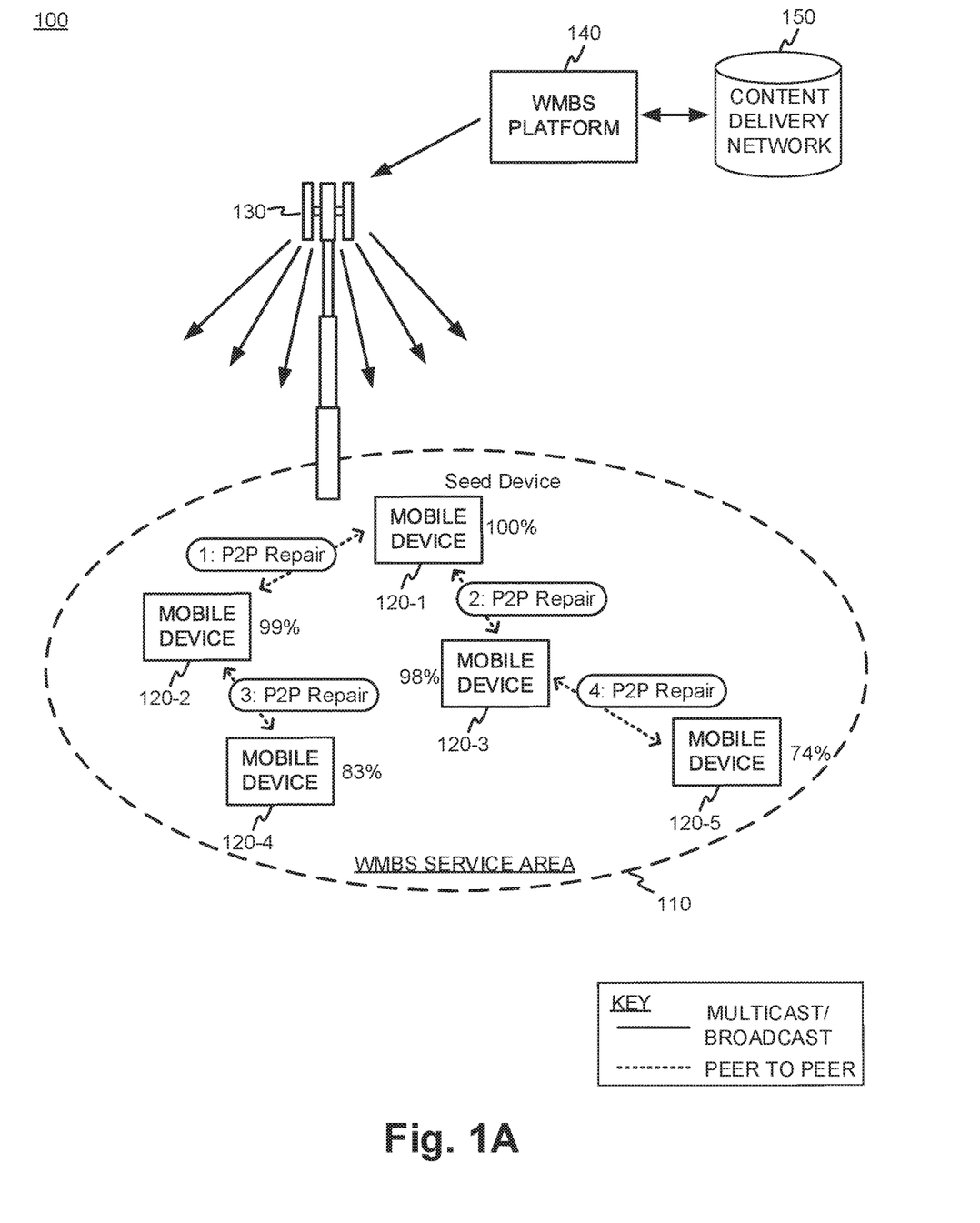
FIGS. 1A and 1B are diagrams showing an exemplary environment associated with repairing WMBS content using peer to peer communications.
Figure 1B:
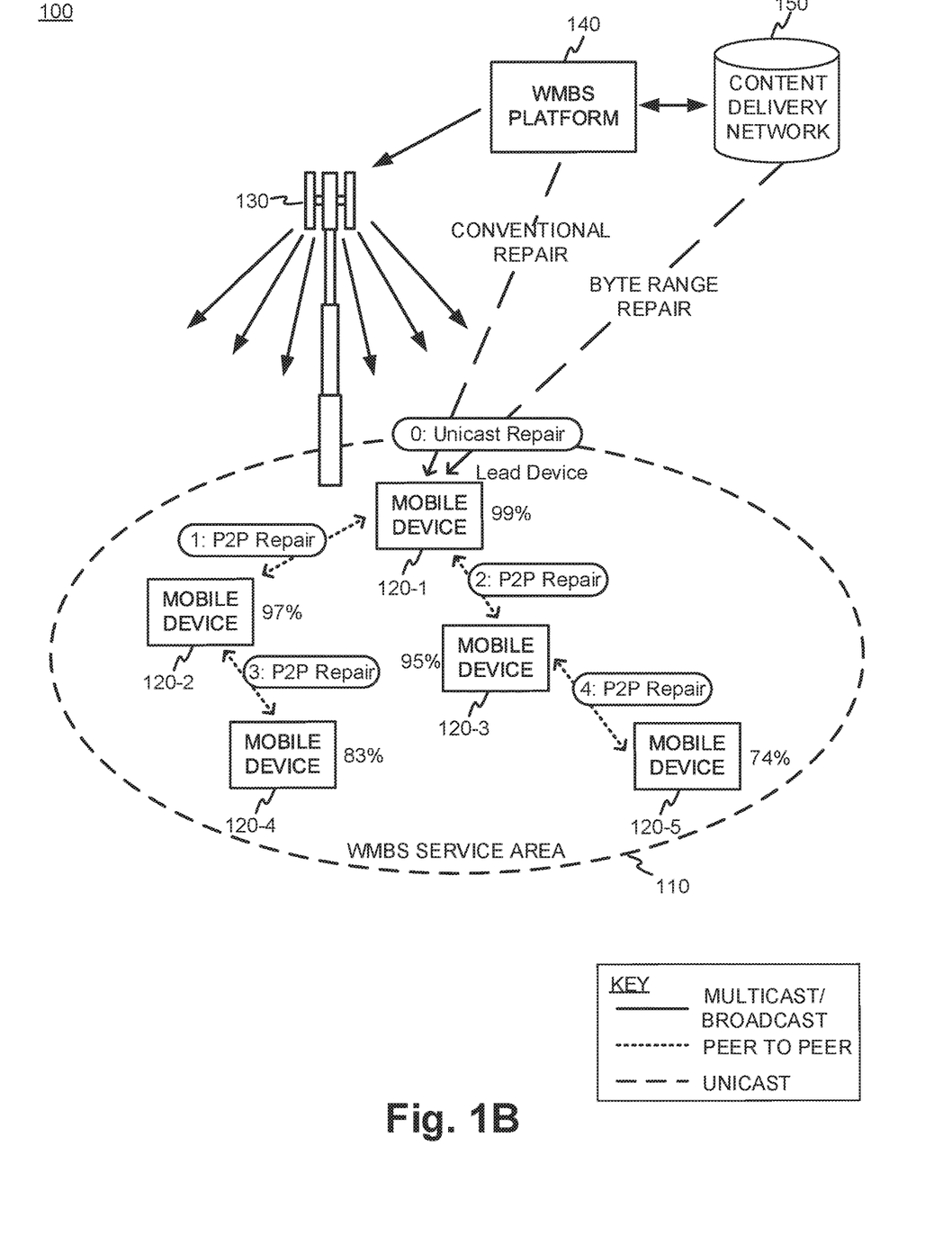

FIGS. 1A and 1B are diagrams showing an exemplary environment 100 associated with repairing wireless multicast/broadcast service (WMBS) content using peer to peer communications. Environment 100 may include an WMBS service area 110, mobile devices 120 (herein referred to plurally as "mobile devices 120," generically as "mobile device 120," and individually as "mobile device 120-x"), base station 130, WMBS platform 140, and content delivery network (CDN) 150.

In environment 100, one or more base stations 130 may establish WMBS service area 110 by providing coordinated transmissions for reception by mobile devices 120 located within WMBS service area 110. WMBS transmissions may be sent over a cellular wireless network, indicated as solid arrows emanating from base station 130 in FIGS. 1A and 1B. The WMBS transmission may be provided using a simulcast technique that sends similar waveforms at substantially the same time from one or more base stations (only one base station 130 is shown in FIGS. 1A and 1B for simplicity). WMBS embodiments presented herein may be implemented using any type of wireless communication standard, such as, for example in long term evolution (LTE) wireless networks (e.g., LTE, LTE Advanced, etc.) using WMBS standards such as the evolved Multimedia Broadcast Multicast System (eMBMS) standard. Alternatively, embodiments herein are applicable to wireless multicast/broadcast services in the upcoming 5G new radio (NR) wireless standards.

Content may be stored in CDN 150 in the form of files. WMBS platform 140 may receive files from CDN 150 and provide them to base station 130, where the files may be efficiently distributed to mobile devices 120 in WMBS service area 110 via multicast or broadcast. During the WMBS service, each mobile device 120 monitors the WMBS transmission from base station 130 to estimate when the end time of the WMBS transmission occurs. Mobile devices 120 may monitor, for example, the file size and/or the transmission bandwidth associated with the WMBS service. Mobile devices 120 may recalculate the end time for verification, because a short time window (e.g., 30 seconds) for establishing file repair may be enforced by WMBS platform 140. Once the WMBS session is complete, mobile devices 120 may start a time to ensure file is initiated within the short time window, and each mobile device 120 may determine how much of the file was received, and then broadcast a completion message to peer mobile devices 120. The completion message may include a mobile device name/identifier, a file name identifying the content received, and a completion status. The completion status may indicate how much of file was received from base station 130. A mobile device 120-x may compare the amount of the file received with the amounts received by peer mobile devices 120.

In instances where one or more mobile devices 120 fail to receive an entire file transmitted by base station 130, the files may be "repaired" via a peer to peer network using two different modes of repair: one type of repair is referred to herein as "seed mode" repair, and the other type of repair referred to as "lead mode" repair.

FIG. 1A is a diagram showing an example where seed mode file repair is performed within exemplary environment 100. If one or more mobile devices 120 report, via the received completion messages, receiving the entire file, the mobile device(s) 120 determine that received the entire file may be designated as a "seed mobile device." As shown in FIG. 1A, mobile device 120-1 received 100% of the file from base station 130, and is thus designated as the seed mobile device. Once designated, seed mobile device 120-1 may generate a prioritized list of peer mobile devices 120 that may be contacted by seed mobile device 120-1 via the peer to peer network (shown in FIGS. 1A and 1B as dashed arrows). The prioritized list generated by mobile device 120-1 may be prioritized using an algorithm, which may sort the nearby mobile devices 120 into a queue based on, for example, proximity, wireless channel strength of the peer to peer network with respect to each peer mobile device 120 (i.e., the wireless device-to-device signal strength, such as the wireless signal strength between seed mobile device 120-1 and each peer mobile device(s) 120), and/or the fraction of the file received by peer mobile devices 120. As shown in FIG. 1A, peer mobile devices 120 are shown in order of the prioritized queue as mobile devices 120-2 through 120-5, based on the percentage of the file received/stored, where larger percentages are given higher priority. Seed mobile device 120-1 may broadcast over the peer to peer network the prioritized list so that peer mobile devices 120-2 through 120-5 receive the queue priority. Additionally, seed mobile device 120-1 may determine a maximum number of allowed simultaneous connections for file repair, which may be set as a configurable parameter on each mobile device 120.

As shown in FIG. 1A, seed mobile device 120-1 may initially provide repair data to mobile device 120-2 (indicated as peer to peer repair and labeled "1"), and then mobile device 120-3 (indicated as peer to peer repair and labeled "2"). Once devices 120-2 and 120-3 receive enough repair data from seed mobile device 120-1 to complete the file, mobile device 120-2 and mobile device 120-3 may transition into seed mode to repair other peer mobile devices further down in the prioritized queue. For example, as shown in FIG. 1A, mobile device 120-2 may provide repair data to mobile device 120-4 (indicated as peer to peer repair and labeled "3"), using the repaired file data received from mobile device 120-1, and mobile device 120-3 may provide repair data to mobile device 120-5 (indicated as peer to peer repair and labeled "4"). The peer to peer repair process concludes once all of the peer mobile devices 120-2 through 120-5 have received and stored the entire file.

FIG. 1B is a diagram showing an example where lead mode file repair is performed within exemplary environment 100. In this example, when all of the mobile devices 120 report, via completion messages, of receiving less than the entire file, mobile devices 120 may determine the mobile device 120-i having the largest amount of the file. For example, as shown in FIG. 1B, mobile device 120-1 received 99% of the file, and is thus designated by mobile devices 120, based on the completion messages, as the "lead device." Once so designated, lead mobile device 120-1 may initiate a unicast session with the network to download repair data and complete the file stored on mobile device 120-1. The unicast session may be undertaken as a conventional byte file repair, in which lead mobile device 120-1 receives repair data from WMBS platform 140. Alternatively, the unicast session may be undertaken as a byte range file repair, where mobile device 120 receives repair data from CDN 150. Whether mobile device 120-1 chooses byte range file repair or conventional file repair may be based upon the amount of data required to repair the file, the costs incurred repairing the file through CDN 150, and the availability of repair data.

Once lead mobile device 120-1 has the entire file, mobile device 120-1 may transition into seed mode as described above in FIG. 1A. Accordingly, newly designated seed mode device 120-1 may generate a prioritized queue for peer mobile devices 120-2 through 120-5, and proceed to send repair data to peer mobile devices 120-2 through 120-5 based on the prioritized queue as described above in FIG. 1A. By only contacting the network with one device (e.g., mobile device 120-1 in FIG. 1B), and having the remaining peer devices 120 use the peer to peer network to obtain the repair data, the connections to the network can be significantly reduced which may lower content cost and reduce network bandwidth consumption, and prevent overloading devices in the WMBS platform 140 and/or CDN 150.

Figure 2:
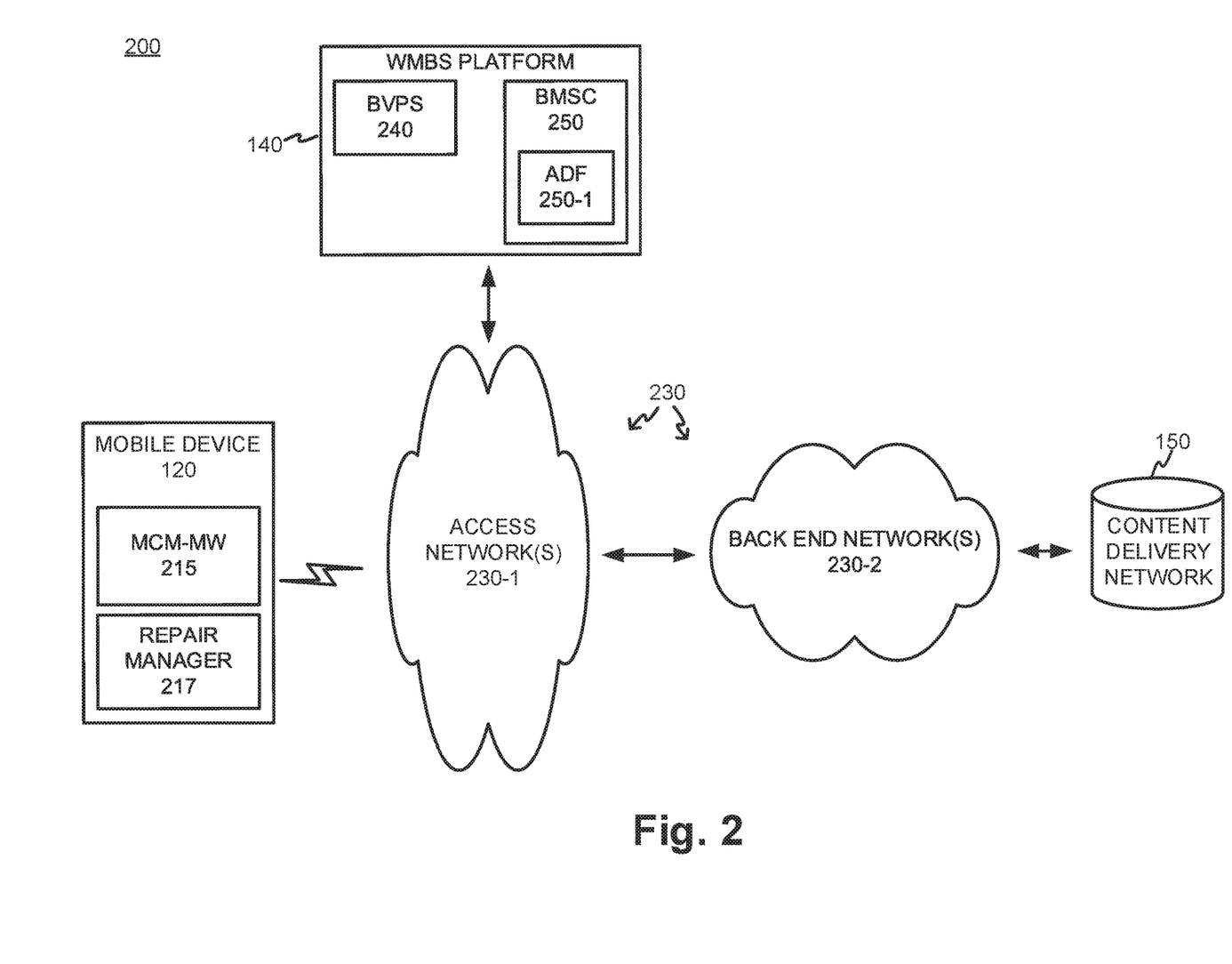
FIG. 2 is a block diagram showing an exemplary networking environment for repairing WMBS content using peer to peer communications according to an embodiment.

FIG. 2 is a block diagram showing an exemplary networking environment 200 for repairing WMBS content using peer to peer communications according to an embodiment. The environment may include a mobile device 120, networks 230, WMBS platform 140, and content delivery network 150. For ease of explanation, only one mobile device 120 is illustrated as being connected to networks 230. However, it should be understood that a plurality of mobile devices 120, may be communicatively coupled to networks 230.

Networks 230 may include a plurality of networks of any type, and may be broadly grouped into one or more access network(s) 230-1 and one or more back end network(s) 230-2. Access network(s) 230-1 provides connectivity between mobile device 120 and other network elements within access network(s) 230-1 and/or back end network(s) 230-2. Access network(s) 230-1 may include, for example, a telecommunications network (e.g., a Public Switched Telephone Network (PSTN)), wired (e.g., Ethernet) and/or wireless local area network(s) (LAN) (e.g., WiFi), wireless wide area networks (WAN) (e.g., WiMax), and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (e.g., LTE, LTE Advanced) PLMN, a 5G new radio (NR) PLMN and/or other types of PLMNs not specifically described herein. In other embodiments, access network(s) 230-1 may alternatively or additionally include any type of Wi-Fi (e.g., any IEEE 801.11x network, where x=a, b, c, g, and/or n). A wide area wireless network may include any type of wireless network covering larger areas, and may include a mesh network (e.g., IEEE 801.11s) and/or or a WiMAX IEEE 802.16.

Back end network(s) 230-2 may exchange data with access network(s) 230-1 to provide mobile device 120 connectivity to various servers, gateways, and other network entities, which may include one or more CDNs 150. Back end network(s) 230-2 may include a wide area network (WAN), a metropolitan area network (MAN), an intranet, the Internet, a wireless satellite network, a cable network (e.g., an optical cable network).

Mobile device 120 may include any type of electronic device having communication capabilities, and thus communicate over networks 230 using a variety of different channels, including both wired and wireless connections. Mobile device 120 may include, for example, a cellular radiotelephone, a smart phone, a tablet, a set-top box (STB), a mobile phone, a Voice over Internet Protocol (VoIP) device, a laptop computer, a palmtop computer, a gaming device, a wearable computer (e.g., a smart watch, eye glasses, etc.), a media player device, or a digital camera that includes communication capabilities (e.g., wireless communication mechanisms). Mobile device 120 may be embedded in other types of devices, such as, for example, enterprise devices such as cash registers, appliances, cameras, digital signs, point of sale terminals; and any type of vehicle used for transportation such as cars, ships, aircraft, golf carts, etc. Mobile device 120 may also be referred to as a "User Equipment" (UE) device when discussed in context with LTE and/or LTE Advanced wireless networks.

Mobile device 120 may further include software for facilitating WMBS operations, including a mobile connected media—middleware (MCM-MW) 215 and a repair manager 217, for facilitating reception and file repair of WMBS content. MCM-MW 215 may control the modem of mobile device 120 and provide functionality for tuning and for unicast file repair of WMBS received content. Repair manager 217 may operate in conjunction with MCM-MW 215 to facilitate file repair between mobile devices 120 over peer to peer networks.

Further referring to FIG. 2, WMBS platform 140 may interface with access network 230-1 and back end networks 230-2 to exchange content data with CDN 150. WMBS platform 140 may include broadcast video provisioning system (BVPS) 240, and broadcast multicast service control/ associative data function (BMSC/ADF) 250. BVPS 240 include one or more computation and/or communication devices that may manage WMBS sessions by, for example, monitoring the number of mobile devices 120 that are receiving WMBS content and monitor network conditions during the WMBS session. For example, BVPS 240 may monitor network congestion, network bandwidth, dates and times of the session, and whether the mobile devices 120 are located within WMBS service area 110. BVPS 240 may also, or alternatively, determine whether to provide a particular content item to one or more mobile devices 120 as a multicast or broadcast transmission, or to allow the content to be provided by unicast. BVPS 240 may also indicate the content that is currently being provided as well as content that may be of interest to users.

BMSC 250 may include one or more computation and/or communication devices, that gather, process, and/or provide information to facilitate WMBS communications. BMSC 250 may reserve bandwidth at WMBS service area 110 (e.g., at base station 130) before a WMBS session begins, and may receive content data (e.g., multimedia) from CDN 150. BMSC 250 may encode the received content data, perform forward error correction, and modulate the data into symbols for transmission. BMSC 250 may multicast or broadcast content data to mobile devices 120 within WMBS service area 110, when mobile device 120 requests the content data, and may terminate the WMBS session after all of the content has been sent, or after a predetermined time period. ADF 250-1 may be part of BMSC 250, and may store and manage the flow of symbols/data generated by BMSC for file repair. ADF 250-1 may answer requests for file repair from mobile device 120, and provide the data in the form of symbols in a unicast response to mobile device 120.

Figure 3:
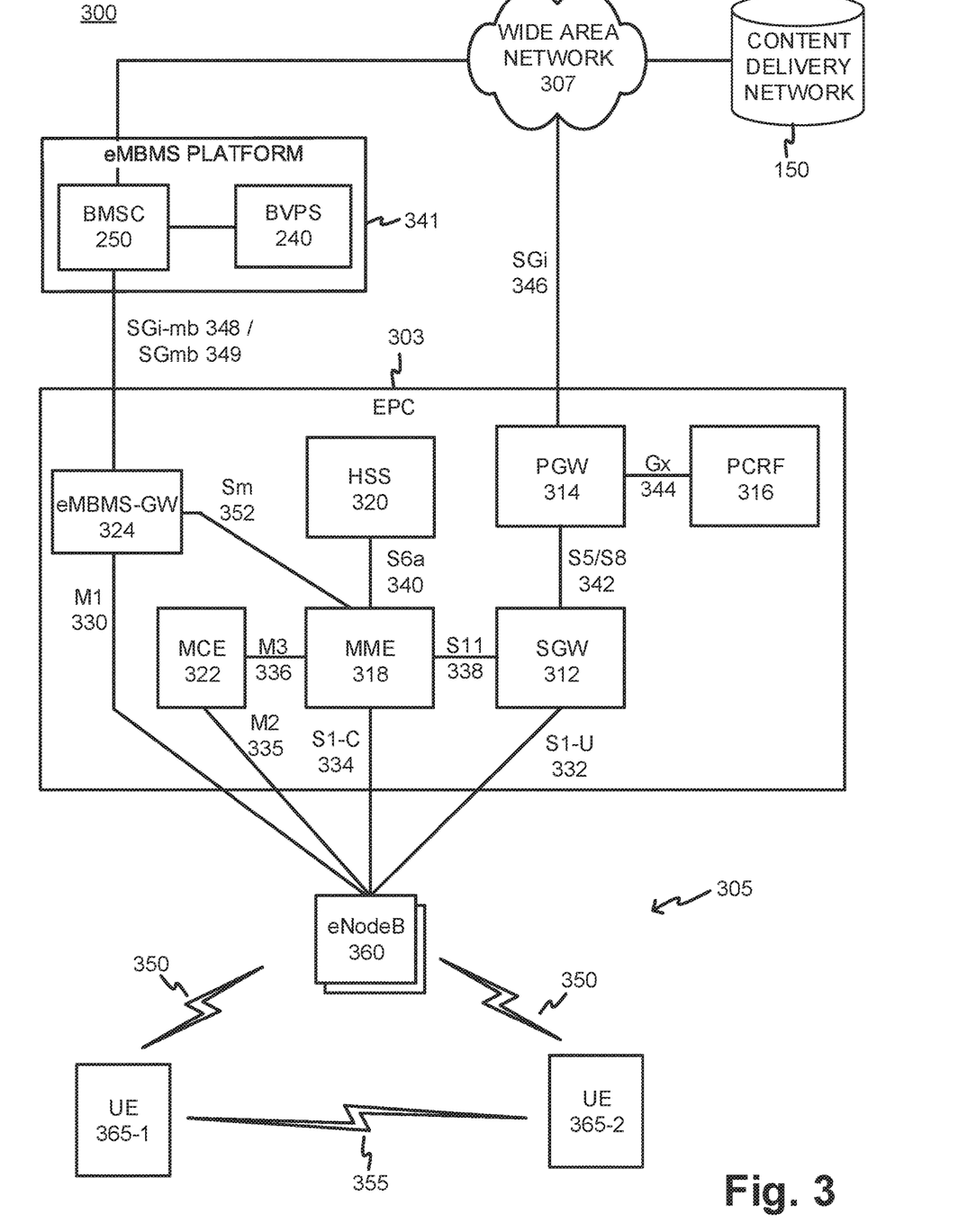
FIG. 3 is a block diagram illustrating an exemplary Long Term Evolution (LTE) networking environment according to an embodiment.

FIG. 3 is a block diagram illustrating an exemplary Long Term Evolution (LTE) networking environment 300 according to an embodiment. LTE environment 300 may include an evolved packet core (EPC) 303, an evolved Universal Mobile Telecommunications System (UMTS) Terrestrial Radio Access Network (eUTRAN) 305, and wide area network (WAN) 307. eUTRAN 305 may further include one or more mobile devices, such as, for example, User Equipment (UEs) 365-1 and 365-2 (as used herein, plurally referred to as "UE 365" and individually as "UE 365-$x$"), and one or more base stations, such as, for example, eNodeBs 360. As described previously, UEs 365 may correspond to mobile devices 120. LTE networking environment 300 may further include a WMBS system embodied as an eMBMS platform 341, which may include BVPS 240 and BMSC 250.

While environment 300 is shown in the context of an LTE network, it should be appreciated that embodiments presented herein may operate in any appropriate wireless network(s). EUTRAN 305 and EPC 303 may further include one or more devices that are physical and/or logical entities interconnected via standardized interfaces. EUTRAN 305 and EPC 303 may provide wireless packet-switched services and wireless Internet Protocol (IP) connectivity to mobile devices to provide, for example, data, voice, and/or multimedia services such as, for example, eMBMS. It is noted that FIG. 3 depicts a representative environment 300 with exemplary components and configuration shown for purposes of explanation. Other embodiments may include additional or different network entities in alternative configurations than which are exemplified in FIG. 3.

Further referring to FIG. 3, EPC 303 may further include a serving gateway (SGW) device 312, a packet data network (PDN) gateway (PGW) 314, a Policy and Charging Rules Function (PCRF) 316, a mobility management entity (MME) 318, a home subscriber server (HSS) 320, a Multicast Coordination Entity (MCE) 322, and an evolved Multimedia Broadcast Multicast System Gateway (eMBMS-GW) 324. It is noted that FIG. 3 depicts a representative EPC 303 with exemplary components and configuration shown for purposes of explanation. Other embodiments may include additional or different network entities in alternative configurations than which are exemplified in FIG. 3.

Further referring to FIG. 3, eNodeBs 360 may include one or more devices and other components having functionality that allow UEs 365 to connect to eUTRAN 305 over an access network wireless channel 350. ENodeBs 360 may interface with EPC 303 via a S1 interface, which may be split into a control plane S1-C interface 334 and a data plane S1-U interface 332. S1-C interface 334 may interface with MME 318. S1-C interface 334 may be implemented, for example, with a protocol stack that includes a Network Access Server (NAS) protocol and/or Stream Control Transmission Protocol (SCTP). S1-U interface 332 may interface with SGW 312 and may be implemented, for example, using a General Packet Radio Service Tunneling Protocol User Plane (GTP-U). ENodeBs 360 may communicate among themselves via an X2 interface (not shown). The X2 interface may be implemented, for example, with a protocol stack that includes an X2 application protocol and SCTP.

For eMBMS functionality, eNodeBs 360 may connect to MCE 322 over an M2 interface 335. The embodiment shown in FIG. 3 illustrates a "centralized MCE architecture" where MCE 322 may be a logical entity that can be deployed as a stand-alone physical entity, or collocated in another physical entity in EPC 303. In another embodiment (not shown), the EPC 303 may be realized using a "distributed MCE architecture" where a single MCE 322 is included in each eNodeB 360. MCE 322 may provide eMBMS session control signaling over M2 interface 335 using SCTP, where eMBMS session control signaling may include radio configuration data for multi-cell transmission modes. EnodeBs 360 may further communicate with eMBMS-GW 324 over an M1 interface 330, and send (i.e., broadcast or multicast) eMBMS packets to each eNodeB 360 which is transmitting data associated with the service. M1 330 interface may be a user plane interface for providing eMBMS traffic that can be implemented using the eMBMS synchronization protocol (SYNC) and GTP-U. The SYNC protocol helps eNodeBs 365 identify the timing for eMBMS radio frame transmission and detect packet loss.

UEs 356 may exchange data with eNodeB 360 over access network wireless channel 350 which may provide both unicast, multicast and broadcast connections over a standard LTE air interface. UEs 365 may also independently exchange data with each other over a peer to peer wireless network 355. Peer to peer wireless network 355 may be any type of wireless interface that may include, for example, any type of Wi-Fi (e.g., any IEEE 801.11x network, where x=a, b, c, g, and/or n). The peer to peer network may also include Bluetooth, a PC-5 interface, or any other type of wireless communications protocol. In an embodiment, peer to peer wireless network 355 may be supported by a wide area wireless network may include any type wireless network covering larger areas, for example a mesh network (e.g., IEEE 801.11s) and/or a WiMAX IEEE 802.16.

SGW 312 may provide an access point to and from UEs 365, may handle forwarding of data packets for UEs 365, and may act as a local anchor point during handover procedures between eNodeBs 360. SGW 312 may interface with PGW 314 through an S5/S8 interface 342. S5/S8 interface 342 may be implemented, for example, using GTP-U.

PGW 314 may function as a gateway to WAN 307 through a SGi interface 346. WAN 307 may include, for example, an IP Multimedia Subsystem (IMS) network, which may provide voice and multimedia services to UE 365, based on Session Initiation Protocol (SIP). A particular UE 365, while connected to a single SGW 312, may be connected to multiple PGWs 314, one for each packet network with which UE 365 communicates.

PCRF 316 provides policy control decision and flow based charging control functionalities. PCRF 316 may provide network control regarding service data flow detection, gating, Quality of Service (QoS) and flow based charging, etc. PCRF 316 may determine how a certain service data flow shall be treated, and may ensure that user plane traffic mapping and treatment is in accordance with a user's subscription profile. PCRF 316 may communicate with PGW 314 using a Gx interface 344. Gx interface 344 may be implemented, for example, using a Diameter protocol.

MME 318 may implement control plane processing for EPC 303 and eUTRAN 305. For example, MME 318 may implement tracking and paging procedures for UEs 365, may activate and deactivate bearers for UEs 365, may authenticate users of UEs 365, and may interface to non-LTE radio access networks. MME 318 may also select a particular SGW 312 for a particular UE 365-$x$. MME 318 may interface with other MMEs (not shown) in EPC 303 and may send and receive information associated with UEs 365, which may allow MME 318 to take over control plane processing of UEs 365 serviced by another MME device, if the other MME device becomes unavailable. MME 318 may communicate with SGW 312 through an S11 interface 338. S11 interface 338 may be implemented, for example, using General Packet Radio Tunneling Protocol Control plane (GTPv2-C). S11 interface 338 may be used to create and manage a new session for a particular UE 365-$x$. S11 interface 338 may be activated when MME 318 needs to communicate with SGW 312, such as when the particular UE 365 attaches to EPC 303, when bearers need to be added or modified for an existing session for the particular UE 365, when a connection to a new PGW 314 needs to created, or during a handover procedure (e.g., when the particular UE 365-$x$ needs to switch to a different SGW 312).

HSS device 320 may store information associated with UEs 365 and/or information associated with users of UEs 365. For example, HSS device 320 may store user profiles that include authentication and access authorization information. MME 318 may communicate with HSS device 320 through an S6a interface 340. S6a interface 340 may be implemented, for example, using a Diameter protocol.

MCE 322 can be a separate entity as shown in FIG. 3 or be included as part of each eNodeB 360. MCE 322 may provide admission control through eMBMS session control signaling and allocate wireless channel resources for UEs 365 in an eMBMS area associated with eUTRAN 305. Specifically, MCE 322 may: 1) allocate time and frequency radio resources for eMBMS transmissions; and 2) determine radio configuration, such as, for example, the Modulation and Coding Scheme (MCS) for eMBMS transmissions by eNodeBs 360. MCE 322 may also be connected with MME 318 over an M3 interface 336 to provide eMBMS session control signaling (e.g., "eMBMS Session Start" and "eMBMS Session Stop" commands) on an eUTRAN Radio Access Bearer (E-RAB) level (i.e., no radio configuration data is conveyed). Exchanges over the M3 interface 336 may performed using SCTP.

eMBMS-GW 324 may distribute (i.e., multicast and/or broadcast) eMBMS user plane data packets to eNodeBs 360 that participate in a eMBMS in an eMBMS area 110. The data packets may be distributed to participating eNodeBs 360 using Internet Protocol (IP) Multicast. eMBMS-GW 324 may receive the eMBMS data packets (e.g., content streams) from CDN 150 via BMSC 250 through WAN 307. The eMBMS data packets may be provided to eMBMS-GW 324 over an SGi-mb interface 348. eMBMS-GW 324 may also exchange eMBMS session control signaling (e.g., session start/update/stop messages) with BMSC 250 over an SG-mb interface 349. The eMBMS session control signaling received from BMSC 250 may be forwarded to MCE 322 over an Sm interface 352, which are in turn forwarded towards the eUTRAN 305 through MME 318. Sm interface 352 may be implemented using a GTPv2-C message protocol which may be carried over User Datagram Protocol (UDP) to start, stop, and modify eMBMS sessions. eMBMS-GW 324 may be a logical entity that exists as a separate device or may be collocated in another device within EPC 303.

eMBMS platform 341 may receive files from CDN 150 via WAN 307 and provide them ePC 303, where files may be efficiently distributed to UEs 365 120 an eMBMS service area via multicast or broadcast. BMSC 250 may act as gateway between content providers (e.g., CDN 150) and eMBMS-GW 324 in EPC 303. BMSC 250 may receive content streams from content providers over wide area network 307 via, for example, an Ethernet connection implementing TCP/IP. As noted above in the description of FIG. 2, BMSC 250 may process the received data to facilitate its distribution as eMBMS packets by EPC 303, and perform bearer processing which may include adding forward error correction and preparing the received data for unidirectional delivery of files using the File Delivery over Unidirectional Transport (FLUTE) protocol. BMSC 250 may also control and schedule the eMBMS sessions by providing session control messages to eMBMS-GW over SGmb interface 349. The session control messages may include service announcements, session start and stop messages, etc. BMSC 250 may also provide admission control for the eMBMS services by providing session membership, user authorization and authentication, and security. CDN 150 and/or BMSC 250 may interface with WAN 307 using an Ethernet connection over TCP/IP, where the physical interfaces may be any interface having sufficient resources to support the exchange of traffic alerts and traffic notifications. Such interfaces may include, for example, 10BASE-T, 1000BASE-TX, and/or 1000BASE-T over twisted pair, coaxial cable, and/or optical fiber.

Wide Area Network 307 may be part of back end network (s) 230-2, and include any type wired or wireless network covering larger areas. For example, WAN 307 may include a metropolitan area network (MAN), a Public Switched Telephone Network (PSTN), an ad hoc network, an intranet, the Internet, a fiber optic-based network, a wireless network, and/or a combination of these or other types of networks. WAN 307 may be an IP based network or utilize Multi-Protocol Label Switching (MPLS), and may include a mesh network (e.g., IEEE 801.11s) and/or or a WiMAX IEEE 802.16. WAN 307 may include one or more circuit-switched networks and/or packet-switched networks.

FIG. 3 depicts a representative environment 300 with exemplary components and configuration and is shown for purposes of explanation. Other implementations may include fewer components, different components, differently arranged components, or additional components than exemplified in FIG. 3.

Figure 4:
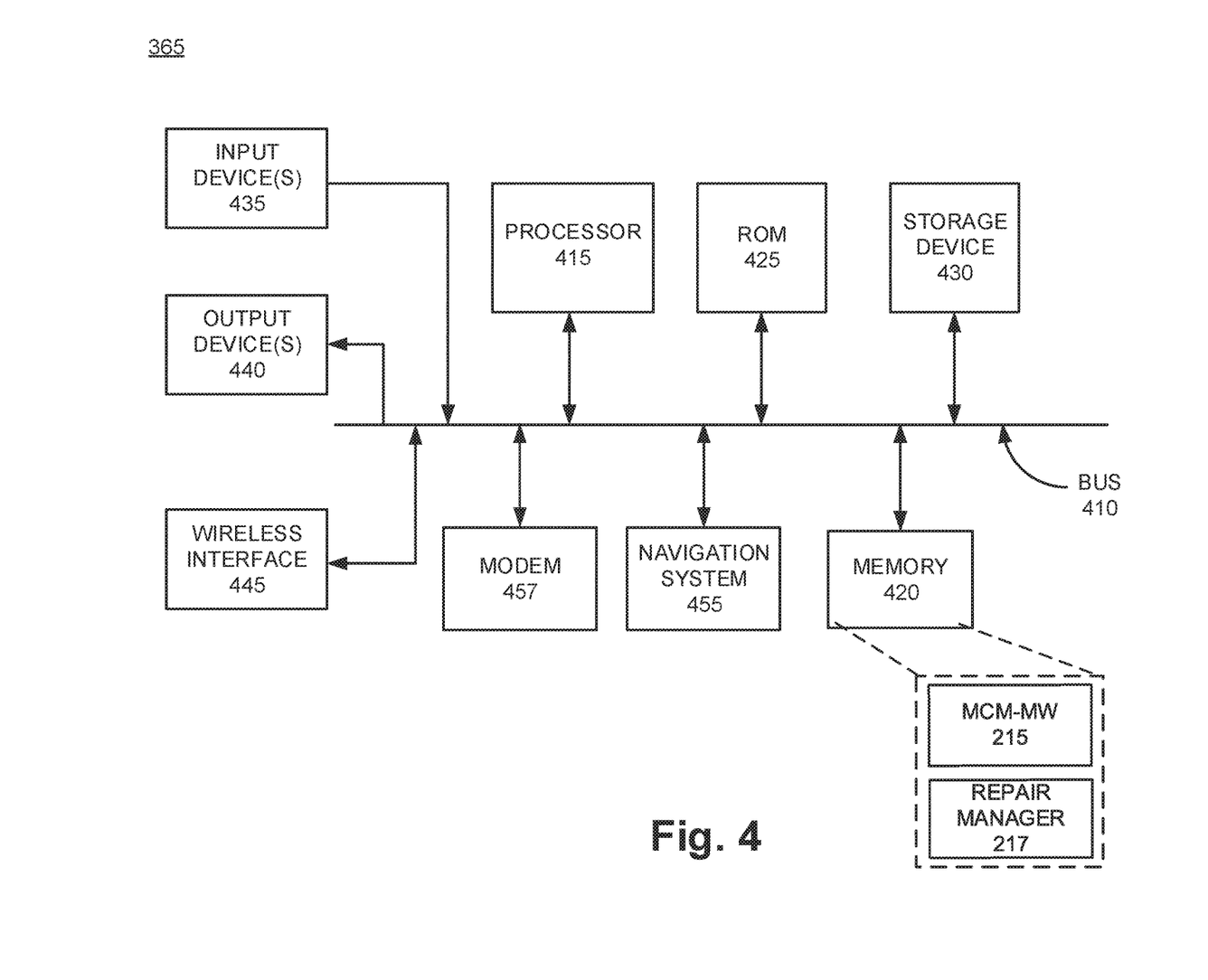
FIG. 4 is a block diagram showing exemplary components of a user equipment device according to an embodiment.

FIG. 4 is a block diagram showing exemplary components of a UE 365 according to an embodiment. UE 365 may include any mobile communication device configured to communicate with access network(s) 230-1 (e.g., eUTRAN 305) via wireless signals. UE 365 may include a bus 410, a processor 415, memory 420, a read only memory (ROM) 425, a storage device 430, one or more input device(s) 435, one or more output device(s) 440, a wireless interface 445, a navigation system 455, and a modem 457. Bus 410 may include a path that permits communication among the elements of UE 365.

Processor 415 may include a processor, microprocessor, or processing logic that may interpret and execute instructions. Memory 420 may include a random access memory (RAM) or another type of dynamic storage device that may store information and instructions for execution by processor 415. In an embodiment, instructions/software corresponding to MCM-MW 215 and/or repair manager 217 may be stored in memory 420. In other embodiments, instructions may also be stored, in whole, or in part, in ROM 425 and/or storage device 430 in addition to memory 420. MCM-MW 215 may control modem 457 to facilitate selection and reception, via access network wireless channel 350, of the broadcast and/or multicast, and provide functionality for unicast file repair of WMBS received content via access network wireless channel 350. The unicast file repair techniques may include, for example, the conventional file repair and/or byte range file repair presented in the discussion of FIG. 1B. Repair manager 217 may operate in conjunction with MCM-MW 215, where repair manager 217 facilitates file repair between UEs 365 over peer to peer wireless network 355.

ROM 425 may include a ROM device or another type of static storage device that may store static information and instructions for use by processor 415. Storage device 430 may include erasable solid state, magnetic and/or optical recording medium and its corresponding drive to store data and/or processor instructions when UE 365 is unpowered or in a power saving mode (e.g., a sleep state). Storage device 430 may include, for example, secure digital (SD) card, flash memory within UE 365, etc.

Input device(s) 435 may include one or more mechanisms that permit an operator to input information to UE 365, such as, for example, a keypad or a keyboard, a microphone, voice recognition, a touchscreen, and/or biometric mechanisms, etc. Output device(s) 440 may include one or more mechanisms that output information to the operator, including a display, a speaker, etc. Wireless interface 445 may include any transceiver mechanism that enables UE 365 to communicate with other devices and/or systems. For example, wireless interface 445 may include mechanisms for communicating with another device or system via a network, such as wireless network eUTRAN 305 via access network wireless channel 350. Additionally, wireless interface 445 permits UE 365 to receive WMBS session content. Wireless interface 455 may also provide mechanisms for communicating with other mobile devices 120 over peer to peer wireless network 355.

Navigation system 455 may be any system that provides position data in an absolute reference (e.g., a satellite navigation system (SNS) receiver providing position data in the WGS-84 system) and/or relative reference(s) (e.g., accelerometers). When deriving positions, navigation system 455 may utilize a receiver specifically designed for use with the SNS that extracts position, using conventional techniques, from a plurality of signals transmitted by SNS satellites. Various SNS may be used, which typically include a system of transmitters positioned to enable mobile devices 120 to determine its location based on signals received from the transmitters. In a particular example, such transmitters may be located on Earth orbiting satellites. For example, a satellite in a constellation of Global Navigation System (GNS) such as Global Positioning System (GPS), Galileo, or Glonass may transmit a signal marked with a Pseudorandom Noise (PN) code that may be distinguishable from PN codes transmitted by other satellites in the constellation.

Modem 457 may facilitate signaling and coordination with network elements in EPC 303 for exchanging data via networks 230. Modem 457 may be a baseband processor that manages network protocols (e.g., WMBS), radio control functions, including signal modulation/demodulation, encoding, frequency shifting, etc., Modem 457 may thus facilitate both access stratum and non-access stratum functionality.

UE 365 may transfer messages and/or perform certain operations or processes, as described in detail below in reference to FIGS. 5-8. UE 365 may perform these operations in response to processor 415 executing software instructions contained in a computer-readable medium, such as memory 420. A computer-readable medium may be defined as a physical or logical memory device. A logical memory device may include memory space within a single physical memory device or spread across multiple physical memory devices. The software instructions may be read into memory 420 from another computer-readable medium, such as storage device 430, or from another device via wireless interface 445. The software instructions contained in memory 420 may cause processor 415 to perform operations or processes that will be described in detail with respect to FIG. 8. Alternatively, hardwired circuitry may be used in place of or in combination with software instructions to implement processes consistent with the principles of the embodiments. Thus, exemplary implementations are not limited to any specific combination of hardware circuitry and software. The configuration of components of UE 365 illustrated in FIG. 4 is for illustrative purposes only. It should be understood that other configurations may be implemented. Therefore, UE 365 may include additional, fewer and/or different components than those depicted in FIG. 4.

Figure 5:
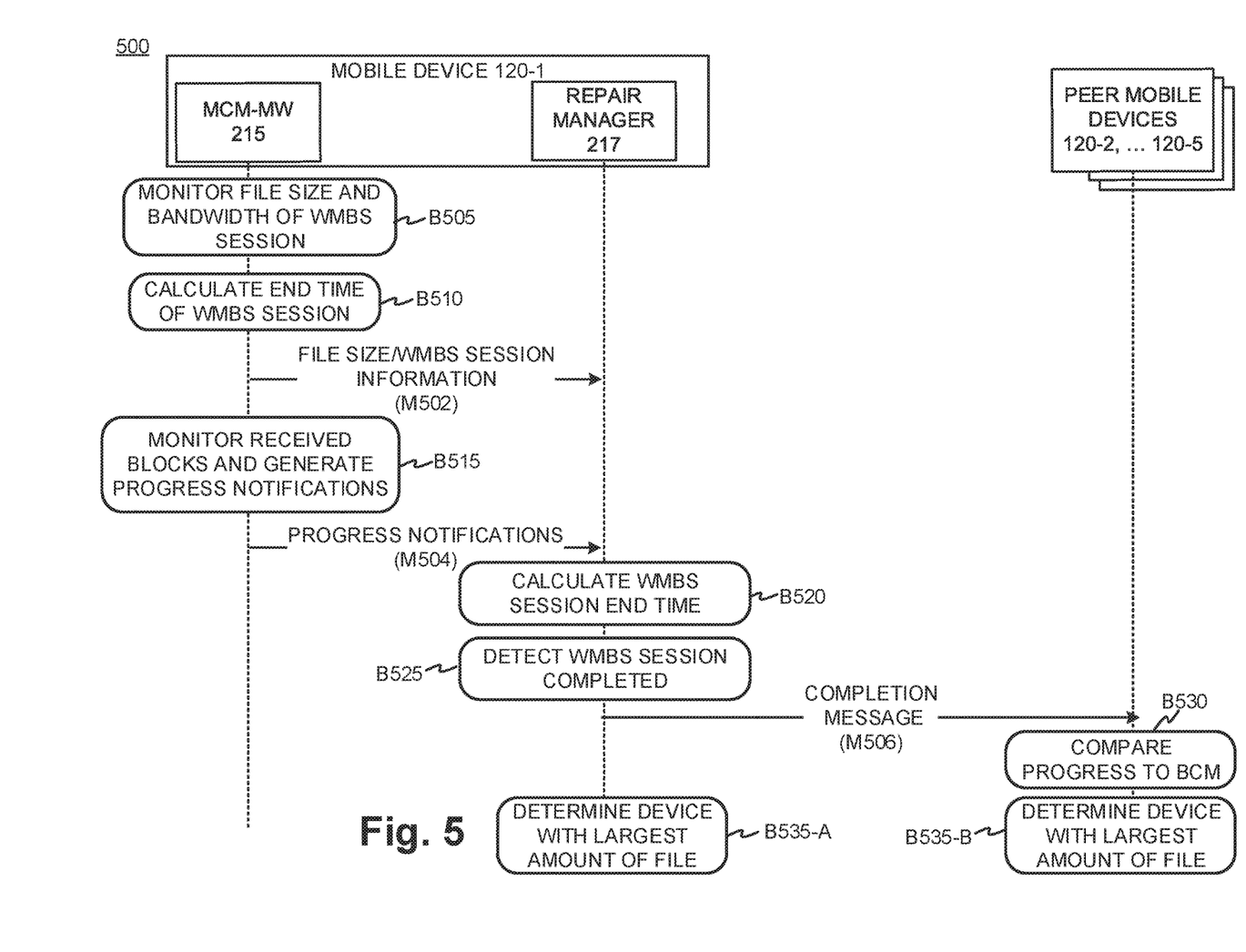
FIG. 5 is a flow diagram showing exemplary process blocks and signal flows for initiating a file repair via a wireless peer to peer network.

FIG. 5 is a flow diagram 500 showing exemplary process blocks and signal flows for initiating a file repair via a wireless peer to peer network 355. For ease of explanation, the process blocks and signal flows in FIG. 5 are primarily shown with respect to mobile device 120-1; however, given the nature of peer to peer networks, any/all mobile devices 120 may perform the process blocks and message exchanges to initiate a file repair via wireless peer to peer network 355. Initially, MCM-MW 215 in mobile device 120-1 may monitor the file size and bandwidth while receiving data from base station 130 via a WMBS session (Block 505). MCM-MW 215 may then calculate an end time of the WMBS session (Block 510). MCM-MW 215 may then send information regarding the on-going WMBS session to repair manager 217, also residing in mobile device 120-1 (Message 502). Message 502 may include file size, received number of blocks, WMBS session bandwidth, and/or other parameters characterizing the ongoing WMBS session. MCM-MW 215 may then monitor blocks received by base station 130 via the WMBS session, generate progress notifications (Block 515) ., and send progress notifications to repair manager (Message 504). Upon receiving Message 502 and Message 504, repair manager 217 may perform a second calculation of the WMBS session end time based on the file size and the received blocks, as a verification of the end time calculated by MCM-MW 215 in Block 510 (Block 520). The end time calculated by repair manager 217 may be more accurate than the end time calculated by MCM-MW 215. Alternatively, repair manager 217 may compute the WMBS session end time by monitoring progress notifications provided in Message 504. Based on the computed end time, repair manager 217 may detect when WMBS session has completed (Block 525). Upon detecting completion, repair manager 217 may broadcast a completion message via wireless peer to peer network 355 to peer mobile devices 120-2 through 120-5 (Message 506). The completion message may identify the sending mobile device 120, the file received during the WMBS session from base station 130, and the download status of the file (e.g., the amount of the file received as a fraction and/or absolute number of bytes, blocks, etc.). Upon receiving the completion message, peer mobile devices 120-2 through 120-5 may compare their progress with respect to receiving the file during the WMBS session to the received broadcast completion message (BCM) from mobile device 120-1 (Block 530).

In a similar manner, once all of the mobile devices 120 have exchanged broadcast completion messages and have compared their respective progress (e.g., completion of the WMBS session), mobile devices 120 may determine which mobile devices 120 received the entire file, or if none of the devices received the entire file, which device received the largest amount of the file via the WMBS session (Blocks 535A and 535B). The mobile device(s) 120 having the entire file may become seed mobile devices, which is discussed further in reference to FIG. 6. If none of the mobile device(s) 120 received 100% of the file, the mobile device receiving the largest amount of the file may be designated as a lead mobile device, which is discussed further in reference to FIG. 7.

Figure 6:
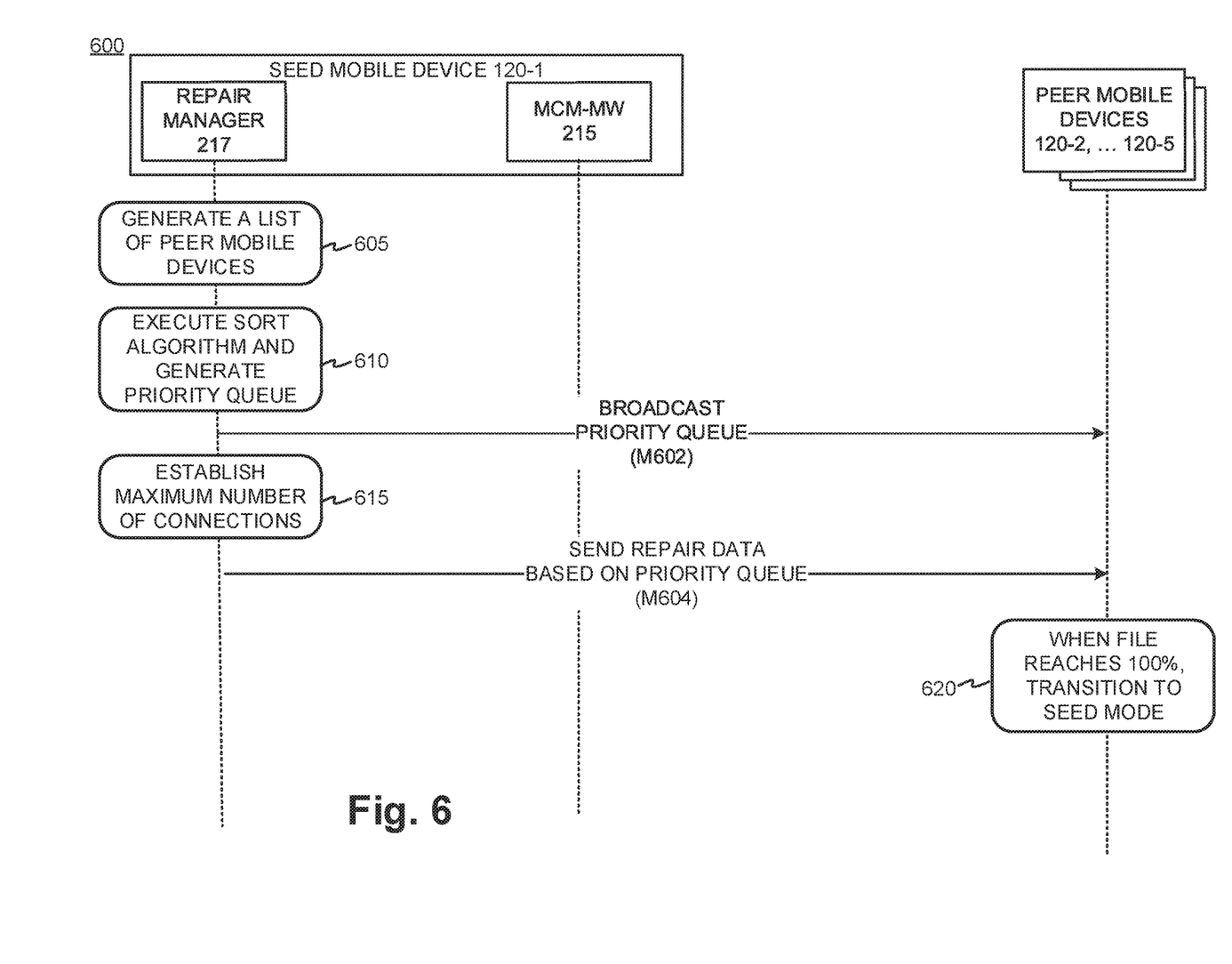
FIG. 6 is a flow diagram showing exemplary process blocks and signal flows for performing a seed mode file repair via a wireless peer to peer network.

FIG. 6 is a flow diagram 600 showing exemplary process blocks and signal flows for performing a seed mode file repair via a wireless peer to peer network 355. As in FIG. 5, for ease of explanation, the process blocks and signal flows in FIG. 6 are primarily shown with respect to mobile device 120-1 which, in the example shown in FIG. 6, has been designated a seed mobile device. However, given the nature of peer to peer networks, any or all mobile devices 120 may perform the process blocks and message exchanges to perform seed mode file repair via wireless peer to peer network 355.

Initially, repair manager 217 within seed mobile device 120-1 may generate a list of available peer mobile devices 120-2 through 120-5 that may exchange data with seed mobile device 120-1 over wireless peer to peer network 355 (Block 605). Once the list is generated, seed mobile device 120-1 may execute a sort algorithm generating a priority queue of peer mobile devices 120-2 through 120-5 (Block 610). The priority queue is sorted to establish the order of peer mobile devices 120-2 through 120-5 in which seed mode file repair will take place. An algorithm executing on seed mode device 120-1 may prioritize peer mobile devices 120-2 through 120-5 based on the amount of the file received during the WMBS session, the signal strength associated with each peer mobile device 120-2 through 120-5, and/or a relative importance of a particular peer mobile device 120 (e.g., based on service agreement quality of service). Once the priority queue is generated, seed mobile device 120-1 may broadcast the priority queue to peer mobile devices 120-2 through 120-5 via wireless peer to peer network 355 (Message 602). Transmitting the priority queue enables peer devices 120-2 through 120-5 to be aware of the queue priority. The priority queue may be recomputed in an ongoing and real-time basis during the seed mode file repair to account for changes in peer mobile device 120-2 through 120-5, such as changes in position, changes in signal strength, etc. In some instances, a peer mobile device 120-$x$ may increase signal strength to increase priority in the priority queue based on user preferences and/or command, the velocity of the peer mobile device 120-$x$, and/or quality of service requirements based on a service agreement.

Seed mobile device 120-1 may then establish a maximum number of simultaneous connections that may be made with peer mobile devices 120-2 through 120-5 over wireless peer to peer network 355 (Block 615). The maximum number of simultaneous connections may be determined as a configurable parameter (by the user or the network operator). Seed mobile device 120-1 may then send repair data to peer mobile devices 120-2 through 120-5 based on the priority queue (Message 604). As each peer mobile device 120-$x$ reaches 100% (entire file is stored) and is fully repaired, peer mobile device 120-$x$ transition into seed mode and supply other peer mobile devices 120 as needed (Block 620). Seed mobile device 120-1 may transition out of seed mode after a predetermined number of file repairs are completed so as to not overload seed mobile device 120-1.

Figure 7:
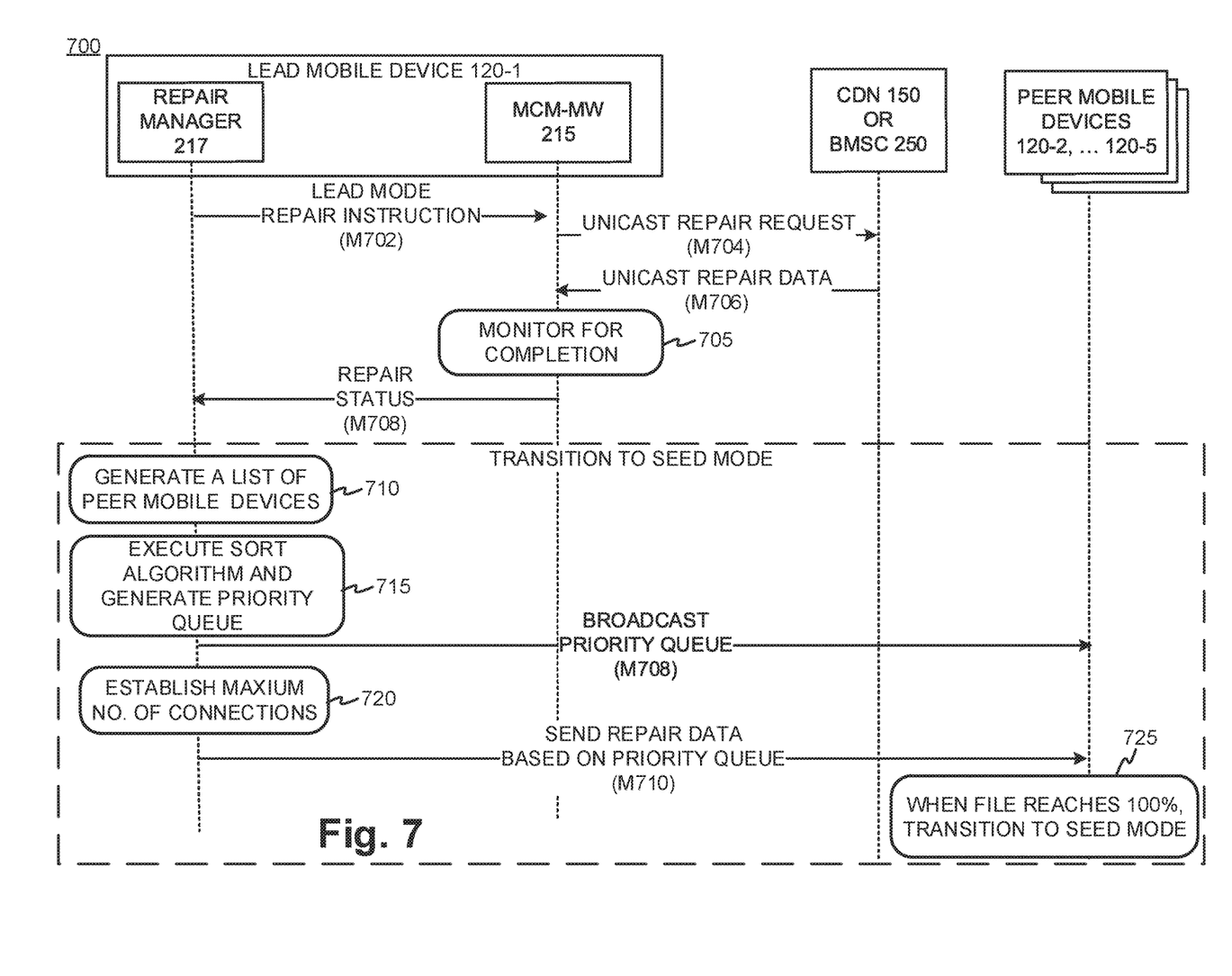
FIG. 7 is a flow diagram showing exemplary process blocks and signal flows for performing a lead mode file repair via a wireless peer to peer network.

FIG. 7 is a flow diagram 700 showing exemplary process blocks and signal flows for performing a lead mode file repair via a wireless peer to peer network 355. As in FIG. 6, for ease of explanation, the process blocks and signal flows in FIG. 7 are primarily shown with respect to mobile device 120-1; however, given the nature of peer to peer networks, all mobile devices 120 may perform the process blocks and message exchanges to perform lead mode file repair via wireless peer to peer network 355. As noted above, if none of the mobile devices 120 received 100% of the file, a particular mobile device 120-$j$ may be selected by mobile devices 120 as a lead mobile device. The lead mobile device may be selected based on having the largest amount of the file received by the WMBS session, the greatest signal strength with access network wireless channel 350, and/or the location and/or velocity of the mobile device 120-$j$, etc. In the embodiment shown in FIG. 7, assume that mobile device 120-1 is designated as a lead mobile device.

Further referring to FIG. 7, repair manager 217 may send a message to instruct MCM-MW 215 to enter lead mode file repair (Message 702). MCM-MW 215 may then transmit a unicast repair request to CDN 150 or BMSC 250 (Message 704). If byte range file repair is desired, message 704 may be sent to CDN 150. If conventional file repair is desired, message 704 may be sent to BMSC 250. The selection of where to send message 704 may depend upon settings in lead mobile device 120-1, and/or which network device (CDN 150 or BMSC 250) has the repair data available. Once the unicast repair request is processed, CDN 150 or BMSC 250 may provide repair data to MCM-MW 215 through a unicast connection over access network wireless channel 350 (Message 706). MCM-MW 215 may monitor the unicast connection to determine when the transmission of file repair data is complete (Block 705). MCM-MW 215 may notify repair manager 217 once the unicast transmission of repair data is complete by sending a repair status message to repair manager 217 (Message 708).

Repair manager 217 within lead mobile device 120-1 may transition to seed mode by generating a list of available peer mobile devices 120-2 through 120-5 that may exchange data with seed mobile device 120-1 over wireless peer to peer network 355 (Block 710). Once the list is generated, lead mobile device 120-1 may execute a sort algorithm and generate a priority queue of peer mobile devices 120-2 through 120-5 (Block 715). The priority queue is sorted to establish the order of peer mobile devices 120-2 through 120-5 in which seed mode file repair will take place. An algorithm executing on lead mode device 120-1 may prioritize peer mobile devices 120-2 through 120-5 based on the amount of the file received during the WMBS session, the signal strength associated with each peer mobile device 120-2 through 120-5, and/or a relative importance of a particular peer mobile device 120 (e.g., based on service agreement quality of service). Once the priority queue is generated, lead mobile device 120-1 may broadcast the priority queue to peer mobile devices 120-2 through 120-5 via wireless peer to peer network 355 (M708). The priority queue is sent so that peer devices 120-2 through 120-5 are aware of the queue priority. The priority queue may be recomputed in an ongoing real-time basis during the seed mode file repair to account for changes in peer mobile device 120-2 through 120-5 such as changes in position, signal strength, etc. In some instances, a peer mobile device 120-$x$ may increase signal strength to increase priority in the priority queue based on user preferences and/or command, the velocity of the peer mobile device 120-$x$, and/or quality of service requirements based on a service agreement).

Lead mobile device 120-1 may then establish a maximum number of simultaneous connections that may be made with peer mobile devices 120-2 through 120-5 over wireless peer to peer network 355 (Block 720). The maximum number of simultaneous connections may be determined as a configurable parameter (by the user or the network operator). Seed mobile device 120-1 may then send repair data to peer mobile devices 120-2 through 120-5 based on the priority queue (M710). As each peer mobile device 120-$x$ reaches 100% (e.g., stores the entire file) and is fully repaired, peer mobile device 120-$x$ transition into seed mode and supply other peer mobile devices 120 as needed (Block 725). Lead mobile device 120-1 may transition out of seed mode after a predetermined number of file repairs are completed so as to not overload lead mobile device 120-1.

Figure 8:
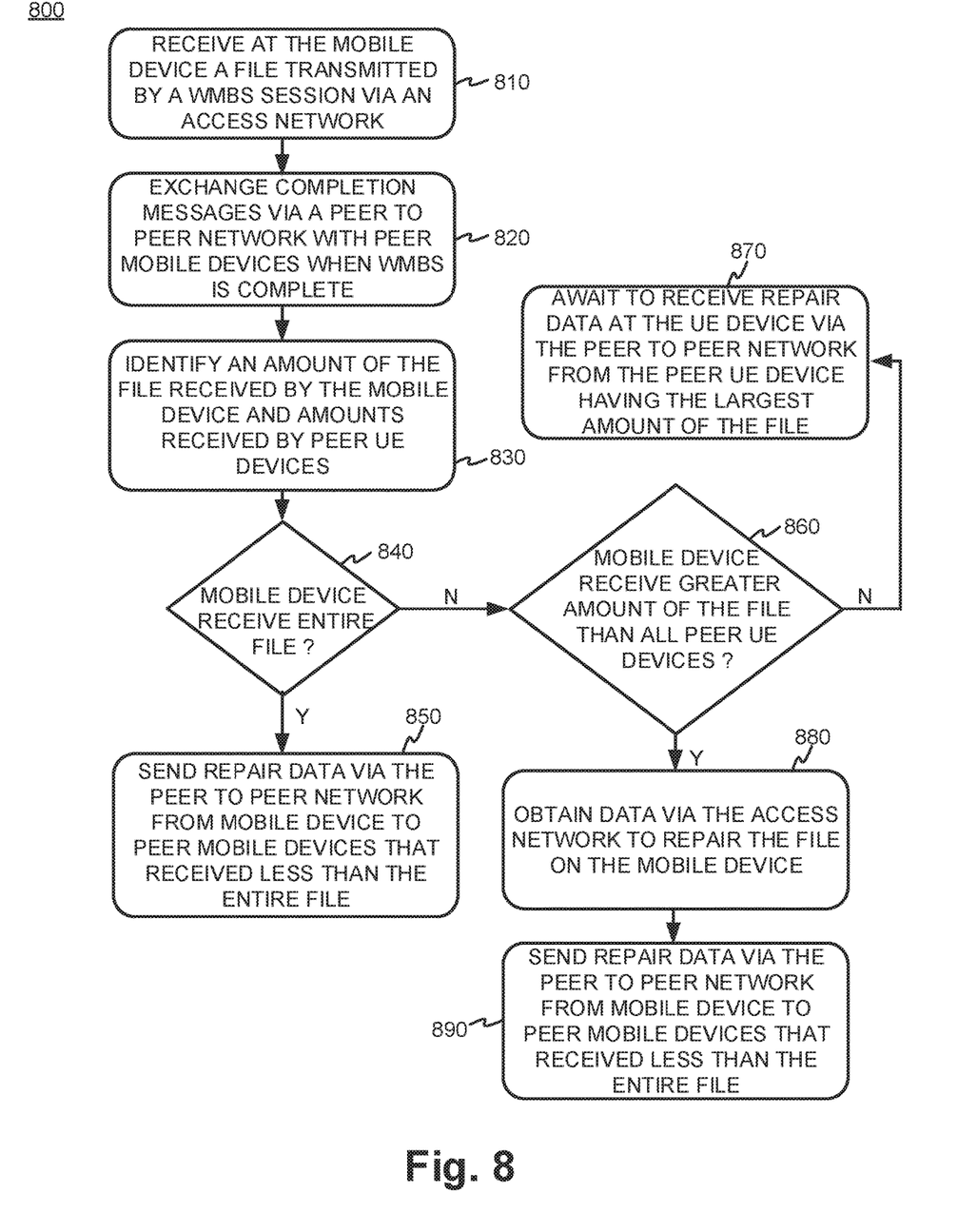
FIG. 8 is a flow chart showing an exemplary process for repairing WMBS session data via a peer to peer network.

FIG. 8 is a flow chart showing an exemplary process 800 for repairing WMBS session data via a peer to peer network. Process 800 may be performed by mobile device 120-1 for example, by executing instructions stored in memory 420 on processor 415. Mobile device 120-1 may initially receive at least a part of a file transmitted by the WMBS session via access network wireless channel 350, where the WMBS session also transmits at least parts of the file to peer mobile devices 120-2 through 120-5 via access network wireless channel 350 (Block 810).

Mobile device 120-1 may then exchange, via peer to peer wireless network 355, completion messages with and peer mobile devices 120-2 through 120-5 upon completion of the WMBS session (Block 820). In an embodiment, exchanging completion messages may further cause mobile device 120 to monitor a file size and/or broadcast bandwidth associated with the WMBS session. Mobile device 120-1 may then calculate, based on the monitoring, an end time of the WMBS session, and generate progress notifications by monitoring received data blocks. Mobile device 120-1 may then generate the completion message, which may identify the sending device, information regarding the file received (e.g., file name, version, hash value, meta data, etc.) via the WMBS session, and the amount of the file received by mobile device 120-1. In another embodiment, mobile device 120-1 may verify, the calculated end time, which may further cause mobile device 120-1 to determine the number of received blocks and recalculate the end time based on the received blocks and a total file size.

Mobile device 120-1 may determine the amount of the file received via the WMBS session at mobile device 120-1, and also determine the amounts of the file received at each peer mobile devices 120-2 through 120-5 based on the exchanged completion messages (Block 830).

Mobile device 120-1 may determine whether it received the entire file via the access network wireless channel 350 during the WMBS session (Block 840).

If mobile device 120-1 received the entire file, then mobile device 120-1 may enter seed mode file repair, and send file repair data via the peer to peer wireless network 355 to a group of peer mobile devices 120-2 through 120-5 identified as receiving amounts less than the entire file (Block 850). In an embodiment, mobile device 120-1 may establish a number of simultaneous connections with peer mobile devices 120-2 through 120-5, where the number of simultaneous connections is a configurable parameter. In another embodiment, mobile device 120-1 may generate a prioritized queue of the peer UE devices 120-2 through 120-5, and provide the prioritized queue to each of peer mobile devices 120-2 through 120-5. Mobile device 120-1 may then send data to repair the file on each of peer mobile devices 120-2 through 120-5 based on the prioritized queue. In an embodiment, mobile device 120-1 may generate the prioritized list by sorting the peer mobile devices 120-2 through 120-5 based on at least one of device to device signal strength, or amounts of the file received by each of the plurality of peer mobile devices 120-2 through 120-5.

If, in Block 840, mobile device 120-1 does not receive the entire file during the WMBS session via access network wireless channel 350 (Block 840-N), mobile device 120-1 may determine whether the amount of the file received is greater than the amounts of the files received by each of peer mobile devices 120-2 through 120-5 (Block 860). If, in Block 860, mobile device 120-1 determines the amount of the file received is not greater than the amounts of the files received by each of peer mobile devices 120-2 through 120-5 (Block 860-N), mobile device 120-1 may wait for repair data to be sent via peer to peer wireless network 355 from one of the peer mobile devices 120-2 through 120-5 having received a file which is larger than other mobile devices 120 (Block 870).

If, in Block 860, mobile device 120-1 determines the amount of the file received is greater than the amounts of the files received by each of peer mobile devices 120-2 through 120-5 (Block 860-Y), mobile device 120-1 will establish a connection to access network 230-1 to obtain file repair data through a unicast session via access network wireless channel 350 (Block 880). In an embodiment, mobile device 120-1 may connect to CDN 150 via the access network wireless channel 350, and request data to repair the file on mobile device 120-1 based on a byte-range file repair procedure. In another embodiment, mobile device 120-1 may connect to WMBS platform 140 multicast platform via access network wireless channel 350, and request data to repair the file on UE device 120-1 based a conventional file repair procedure.

Once mobile device 120-1 receives the repair data to complete the file, mobile device 120-1 may transition into seed mode by sending file repair data, via peer to peer wireless network 355, to peer mobile devices 120-2 through 120-5 for repairing the files on each of the peer mobile devices 120-2 through 120-5 (Block 890).

Embodiments for repairing files using peer to peer networks may be applicable to a variety of environments where a group of mobile devices receive data through WMBS services. For example, WMBS services may be used to broadcast large amounts of data (e.g., 6 Gigabytes of video content) each evening to a cluster of tablet devices which may be embedded in golf carts. Conventional approaches for repairing the video content on the tablet devices may utilize 200 simultaneous unicast connections requests, which may disrupt the network. Having the tablets repair the video content over a peer to peer network prevents overloading the wireless network and saves operational costs. In another embodiment, large groups automobiles may have firmware updates applied at ports of entry as they are being moved off transport ships. Thus, there may be tens of thousands of automobiles waiting in a queue as part of the transport logistic process. WMBS sessions are an efficient approach to update firmware in the vehicles, and peer to peer file repair can ensure that each vehicle will receive a complete firmware update in an efficient and cost-effective manner. In another embodiment, firmware over the air (FOTA) updates for enterprise devices, such as cash registers, digital signs, appliances, taxi/transit vehicles, traffic cameras, etc., may be provided over WMBS sessions. Repairing firmware files using a peer to peer network between the enterprise devices can avoid large clusters of devices choking the network with simultaneous unicast repair requests.

The foregoing description of implementations provides illustration and description, but is not intended to be exhaustive or to limit the invention to the precise form disclosed. Modifications and variations are possible in light of the above teachings or may be acquired from practice of the invention. For example, while series of messages and/or blocks have been described with regard to FIGS. 5-8, the order of the messages and/or blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   receiving, at a user equipment (UE) device, at least a part of a file transmitted by a wireless multicast/broadcast service (WMBS) session via an access network, wherein the WMBS session also transmits at least parts of the file to a plurality of peer UE devices via the access network;
   exchanging, via a peer to peer network, completion messages between the UE device and the plurality of peer UE devices upon completion of the WMBS session;
   identifying, at the UE device, an amount of the file received at the UE device, and amounts of the file received at each of the plurality of peer UE devices based on the exchanged completion messages;
   sending data, via the peer to peer network from the UE device to a group of peer UE devices identified as receiving amounts less than the entire file, to repair the file on each of the group of peer UE devices, in response to identifying that the UE device received the entire file; and
   obtaining data, via the access network, to repair the file on the UE device in response to identifying that the UE device received less than the entire file and receive more of the file than each of the group of peer UE devices, and sending data, via the peer to peer network, of the repaired file from the UE device to the group of peer UE devices to repair the file on each of the group of peer UE devices.

2. The method of claim 1, wherein exchanging completion messages further comprises:
   monitoring, at the UE device, at least one of file size or broadcast bandwidth associated with the WMBS session;
   calculating, at the UE device based on the monitoring, an end time of the WMBS session;
   generating, by the UE device, progress notifications by monitoring received data blocks; and
   generating, at the UE device, the completion message, wherein the completion message identifies a sending UE device, the file received via the WMBS session, and the amount of the file received by the UE device.

3. The method of claim 2, further comprising:
   verifying, at the UE device, the calculated end time, wherein the verifying further comprises:
   determining the number of received blocks; and
   recalculating the end time based on the received blocks and a total file size.

4. The method of claim 1, wherein sending data from the UE device to the group of peer UE devices further comprises:
   establishing, by the UE device, a number of simultaneous connections with the peer UE devices, wherein the number of simultaneous connections is a configurable parameter.

5. The method of claim 1, wherein sending data from the UE device to the group of peer UE devices comprises:
   generating, at the UE device, a prioritized queue of the group of peer UE devices;
   providing, from the UE device, the prioritized queue to each of the group of peer UE devices; and
   sending, from the UE device, data to repair the file on each of the group of peer UE devices based on the prioritized queue.

6. The method of claim 5, wherein generating the prioritized queue further comprises:
   sorting the group of peer UE devices based on at least one of device to device signal strength, or amounts of the file received by each of the plurality of the group of peer UE devices.

7. The method of claim 1, wherein obtaining data from the network to repair the file on the UE device further comprises:
   determining that the UE device received a greater amount of the file than any of the group of peer UE devices; and
   establishing a connection to the access network to receive data to repair the file on the UE device.

8. The method of claim 7, wherein establishing a connection further comprises:
   connecting to a content delivery network via the access network; and
   requesting data to repair the file on the UE device based on a byte range repair procedure.

9. The method of claim 7, wherein establishing a connection further comprises:
   connecting to a multicast platform via the access network; and
   requesting data to repair the file on the UE device based on a conventional file repair procedure.

10. A user equipment (UE) device, comprising:
    a wireless interface that communicates via an access network and a peer to peer network;
    a memory configured to store instructions; and
    a processor, coupled to the wireless interface and the memory, wherein the processor is configured to execute the instructions stored in the memory to:
    receive at least a part of a file transmitted by a wireless multicast/broadcast service (WMBS) session via the access network, wherein the WMBS session also transmits at least parts of the file to a plurality of peer UE devices via the access network;
    exchange, via the peer to peer network, completion messages between the UE device and the plurality of peer UE devices upon completion of the WMBS session;

identify an amount of the file received at the UE device, and amounts of the file received at each of the plurality of peer UE devices based on the exchanged completion messages;
send data, via the peer to peer network, to a group of peer UE devices identified as receiving amounts less than the entire file, to repair the file on each of the group of peer UE devices, in response to identifying that the UE device received the entire file; and
obtain data, via the access network, to repair the file on the UE device in response to identifying that the UE device received less than the entire file and receive more of the file than each of the group of peer UE devices, and send data, via the peer to peer network, of the repaired file from the UE device to the group of peer UE devices to repair the file on each of the group of peer UE devices.

11. The UE device of claim 10, wherein the instructions to exchange completion messages further causes the processor to:
monitor at least one of file size or broadcast bandwidth associated with the WMBS session;
calculate, based on the monitoring, an end time of the WMBS session;
generate progress notifications by monitoring received data blocks; and
generate the completion message, wherein the completion message identifies a sending UE device, the file received via the WMBS session, and the amount of the file received by the UE device.

12. The UE device of claim 11, further comprising instructions to cause the processor to
verify the calculated end time, wherein the instructions to verify cause the processor to:
determine the number of received blocks; and
recalculate the end time based on the received blocks and a total file size.

13. The UE device of claim 10 wherein the instructions to send data from the UE device to the group of peer UE devices further cause the processor to:
establish a number of simultaneous connections with the peer UE devices, wherein the number of simultaneous connections is a configurable parameter.

14. The UE device of claim 10, wherein the instructions to send data from the UE device to the group of peer UE devices further cause the processor to:
generate a prioritized queue of the group of peer UE devices;
provide the prioritized queue to each of the group of peer UE devices; and
send data to repair the file on each of the group of peer UE devices based on the prioritized queue.

15. The UE device of claim 14, wherein the instructions to generate the prioritized queue further cause the processor to:
sort the group of peer UE devices based on at least one of device to device signal strength, or amounts of the file received by each of the plurality of the group of peer UE devices.

16. The UE device of claim 10, wherein the instructions to obtain data from the network to repair the file on the UE device further cause the processor to:

determine that the UE device received a greater amount of the file than any of the group of peer UE devices; and
establish a connection to the access network to receive data to repair the file on the UE device.

17. The UE device of claim 16, wherein the instructions to establish the connection further cause the processor to:
connect to a content delivery network via the access network; and
request data to repair the file on the UE device based on a byte-range repair procedure.

18. The UE device of claim 16, wherein the instructions to establish a connection further cause the processor to:
connect to a multicast platform via the access network; and
request data to repair the file on the UE device based a conventional file repair procedure.

19. A non-transitory computer readable medium comprising instructions, which, when executed by a processor, causes the processor to:
receive, at a UE device, at least a part of a file transmitted by a wireless multicast/broadcast service (WMBS) session via the access network, wherein the WMBS session also transmits at least parts of the file to a plurality of peer UE devices via the access network;
exchange, via a peer to peer network, completion messages between the UE device and the plurality of peer UE devices upon completion of the WMBS session;
identify, at the UE device, an amount of the file received at the UE device, and amounts of the file received at each of the plurality of peer UE devices based on the exchanged completion messages;
send data, via the peer to peer network, to a group of peer UE devices identified as receiving amounts less than the entire file, to repair the file on each of the group of peer UE devices, in response to identifying that the UE device received the entire file; and
obtain data, via the access network, to repair the file on the UE device in response to identifying that the UE device received less than the entire file and received more of the file than each of the group of peer UE devices, and send data, via the peer to peer network, of the repaired file from the UE device to the group of peer UE devices to repair the file on each of the group of peer UE devices.

20. The non-transitory computer readable medium of claim 19, wherein the instructions to exchange completion messages further causes the processor to:
monitor, at the UE device, at least one of file size or broadcast bandwidth associated with the WMBS session;
calculate, at the UE device, based on the monitoring, an end time of the WMBS session;
generate, at the UE device, progress notifications by monitoring received data blocks; and
generate, at the UE device, the completion message, wherein the completion message identifies a sending UE device, the file received via the WMBS session, and the amount of the file received by the UE device.

* * * * *